United States Patent [19]

Ringel

[11] 4,075,104
[45] Feb. 21, 1978

[54] DEVICE FOR SEPARATING IN A CONTINUOUS PROCESS PARTICLES FROM A FIRST LIQUID AND INTRODUCING THE SEPARATED PARTICLES INTO A SECOND LIQUID

[75] Inventor: Helmut Ringel, Hambach, Germany

[73] Assignee: Kernforschungsanlage Julich Gesellschaft mit beschrankter Haftung, Julich, Germany

[21] Appl. No.: 613,267

[22] Filed: Sept. 15, 1975

[30] Foreign Application Priority Data

Sept. 13, 1974 Germany .............................. 2443843

[51] Int. Cl.² ............................................ B01D 33/06
[52] U.S. Cl. .................................... 210/402; 209/270; 210/416 R
[58] Field of Search ............... 210/400, 402, 418, 359, 210/66, 77; 209/270, 272; 162/323, 330, 335, 357

[56] References Cited

U.S. PATENT DOCUMENTS

| | | | |
|---|---|---|---|
| 2,598,606 | 5/1952 | Robison, Jr. | 210/77 |
| 2,765,915 | 10/1956 | Nilsson | 210/77 X |
| 3,490,585 | 1/1970 | Gooding et al. | 209/270 X |
| 3,741,388 | 6/1973 | Takahashi | 210/77 X |

*Primary Examiner*—Frank W. Lutter
*Assistant Examiner*—William A. Cuchlinski, Jr.
*Attorney, Agent, or Firm*—Walter Becker

[57] ABSTRACT

A device for separating in a continuous process particles such as heavy metal particles consisting of fuel and/or breeder materials for core reactors, from a first liquid and introducing the separated particles into a second liquid. The device comprises a screen in the form of a movable endless belt or drum over which ends a feeding line conveying the first liquid containing the particles to be separated onto the endless screen. While the particles are retained on the surface of the moving screen journalled in a housing, the first liquid passes through the screen into a catching funnel and from there to a discharge, the catching funnel being arranged in the housing. In the lower portion of the housing and in contact with the outer screen surfaces is a second liquid which takes off from the outside of the screen the particles deposited onto the screen.

6 Claims, 2 Drawing Figures

DEVICE FOR SEPARATING IN A CONTINUOUS PROCESS PARTICLES FROM A FIRST LIQUID AND INTRODUCING THE SEPARATED PARTICLES INTO A SECOND LIQUID

The present invention relates to a device for separating particles such as heavy metal particles consisting of fuel and/or breeder materials for core reactors, from a liquid and for introducing the particles into a second liquid by a conduit for the liquid containing the particles, with a screen adapted to be driven and designed as an endless belt or drum for separating the particles contained in the liquid and with a discharge for the liquid.

If particles are to be separated from one liquid and to be introduced into a second liquid without both liquids contacting each other, special steps are necessary. If in this connection, liquids easily mixable with each other are involved, particular care is necessary when carrying out the various steps. This is the case for instance when ball-shaped heavy metal particles consisting of fuel and/or breeder materials for core reactors, which are produced in conformity with a wet chemical method, are from the liquid in which they are formed, without risking the danger of destroying the particles to be introduced into a second liquid which may be a washing liquid. Such particles must during this method step not undergo any change in condition and are furthermore easily destroyed when subjected to mechanical stresses. Even a sliding or rolling on a solid foundation could not be endured by the particles without being damaged. It is, therefore, necessary to carry out the exchange in a very careful manner.

If the heavy metal particles are to be produced from highly radioactive heavy metal solutions as is the case in connection with the refabrication of fuel and/or breeder elements, in order to separate the particles from one liquid and introduce the same into a second liquid, steps are aimed at which will also be suitable for working in hot cells. It is known to introduce a certain quantity of the liquid containing the particles, into a pressure resistant container which has been previously partly filled with the second liquid (see Energia Nucleare, Vol. 17, No. 4, Apr. 1970, Pages 225-233). The particles are then separated from the first liquid by pressing the same under pressure out of the container while the particles remain in the container. The particles can thereupon with the second liquid be withdrawn from the container. In this connection, however, it is disadvantageous that in connection with the just described method considerable portions of the two liquids are intermixed. It is likewise disadvantageous that in this manner only an interrupted or discontinuous operation is possible.

It is, therefore, an object of the present invention to provide a device for separating particles from a liquid and introducing the separated particles into a second liquid, which device will make it possible to separate the particles in a careful manner from the first liquid and will also make it possible to introduce the separate particles into the second liquid while simultaneously assuring that both liquids will not contact each other.

It is another object of this invention to provide a device as set forth in the preceding paragraph, which will be simple in construction and which will permit a continuously and practically sevice-free operation.

These objects and other objects and advantages of the invention will appear more clearly from the following specification in connection with the accompanying drawing, in which.

Figure 1:
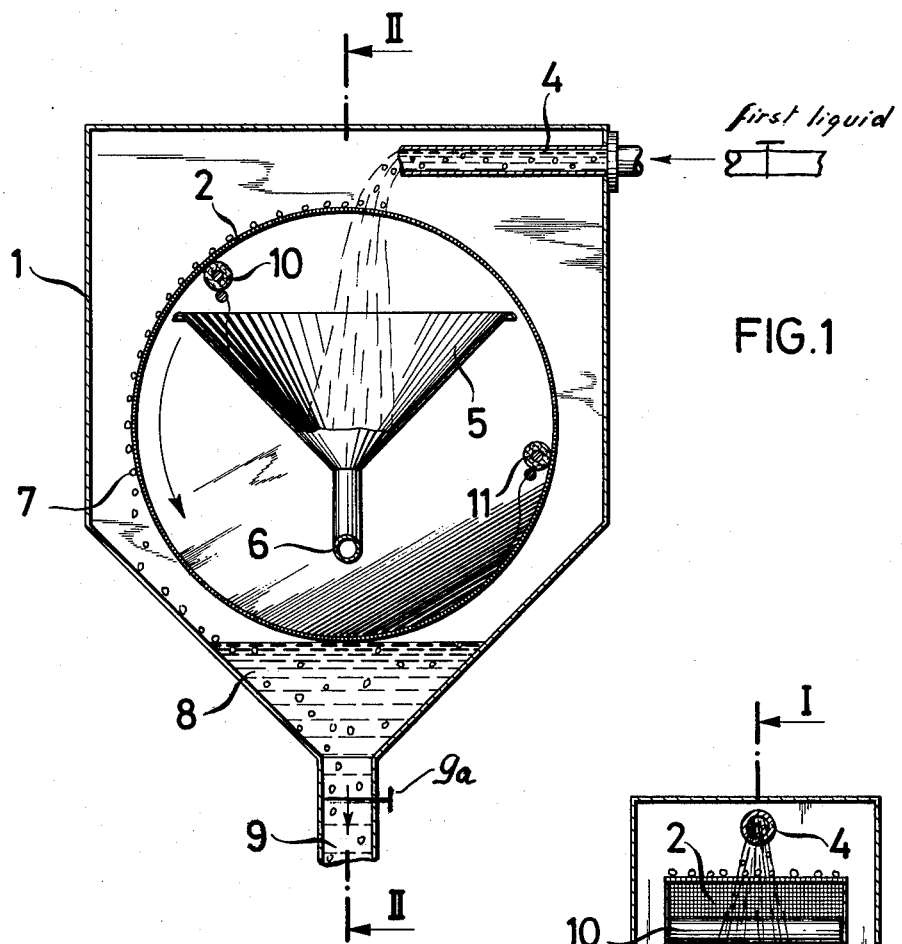
FIG. 1 illustrates a longitudinal section through a device according to the invention with a screen designed as a trommel revolving screen, said section being taken along the line I—I of FIG. 2.
Figure 2:
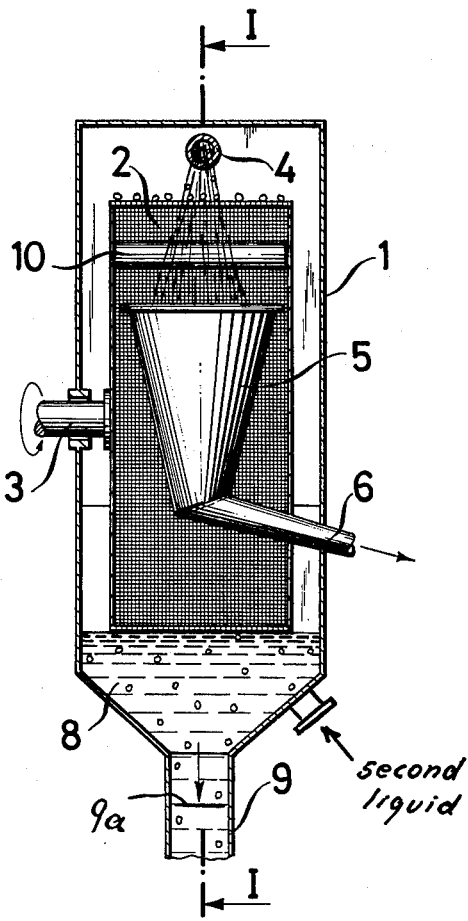
FIG. 2 is a cross section through the device according to FIG. 1, said cross section being taken along the line II—II of FIG. 1.

The device according to the present invention is characterized primarily in that the feeding line for the liquid containing the particles has its discharge mouth above the screen and that in the chamber surrounded by the screen for discharging the liquid, below said mouth there is provided a catching funnel connected to the discharge. The device is furthermore characterized in that the screen is so arranged that the particles carried along by the screen are separated from the screen by the second liquid contained in a container.

Inasmuch as the particles due to small liquid residues of the first liquid still adhering to the particles and to the screen are kept on the screen in view of the surface tension of the liquid and are not detached by the force of gravity acting thereupon from the outside of the screen, it may be expedient so to arrange the screen that it immerses with its lower portion into the second liquid. In this way, the particles carried along by the screen to the bottom side of the screen are when entering the second liquid rinsed off the screen by the liquid and in the latter drop downwardly.

A particularly advantageous modification of the device according to the present invention consists in that the screen is above the liquid level of the second liquid so arranged that the liquid level for detaching particles adhering to the screen contacts only the particles. This brings about that the particles in view of the influence of the second liquid are separated from the screen while the screen, however, does not come into contact with the second liquid. An intermixing of the two liquids is thus practically impossible.

If the particles due to the influence of the force of gravity detach themselves from the screen in groups and drop into the second liquid, it is, of course, also possible so to arrange the screen that neither the screen nor the particles come into contact with the second liquid.

It has proved expedient for rinsing liquid residues at the inside of the screen in the direction of movement of the screen behind the mouth of the feeding line to arrange a suction device and behind the detaching area in the direction of movement of the screen to provide a suction device for the liquid, and more specifically to arrange such liquid suction device for the liquid above the liquid level of the second liquid. In this way, an intermixing of the two liquids will be prevented also when the screen contacts a second liquid.

It may furthermore be expedient to provide a discharge for the second liquid in the container which contains the second liquid. In this way, it is possible to convey the second liquid in the lower portion of the container in counterflow to the particles passing into the second liquid. The second liquid will against the sinking direction of the particles enter the container at the bottom and will flow off from the container through the outlet thereof.

The simple mechanical structure of the device according to the invention assures a trouble-free operation. The device according to the invention is therefore particularly suitable for carrying out the method of separation of particles within a process for making particles and in particular for operations in hot cells.

Referring now to the drawing in detail, it will be seen that in a container-shaped housing 1 there is provided around an axle 3 a screen 2 designed as a trommel or revolving screen. The axle 3 is rotatably journalled in the housing.

As will also be seen from the drawing, the liquid containing the particles is through a line 4 from above passed onto the trommel or revolving screen so that the particles are retained on the outside of the screen whereas the liquid passes through the screen. The liquid separated from the particles in this way is caught by a collecting funnel 5 arranged the trommel or revolving screen and is through a discharge 6 passed from the interior of the trommel or revolving screen and the housing 1.

The particles 7 retained by the outside of the screen are taken along by the trommel or revolving screen in the direction of rotation indicated by the arrow, and as soon as these particles have reached the bottom side of the revolving screen are wetted by the second liquid 8 which is contained in the lower part of container 1 which lower part is designed as container for the second liquid. The particles are thus detached from the screen. In the second liquid 8, the particles sink downwardly and can be withdrawn from the container through its outlet 9 having an adjustable valve 9a therein for controlling the level of the second liquid in the chamber formed by the lower portion of the housing.

As will furthermore be evident from FIG. 1, two felt rollers 10 and 11 arranged within the screen 2 as withdrawing devices are so arranged that they respectively withdraw from the inner wall of the screen the liquid residues adhering to the screen and again convey the liquid residues to the corresponding liquid.

Onto the screen 2 of the embodiment of the device shown in FIG. 1 there was conveyed a liquid flow of 1.2 liters per minute whereby approximately $15 \times 10^3$ particles are per minute conveyed to the screen. The diameter of the particles amounted to approximately 1.2mm. The mesh width of the screen which consists of a mesh wire fabric amounted to 0.8mm. The diameter of the trommel or revolving screen 2 amounted to 200mm and the width of the screen was 100mm. The speed of the screen 2 amounted to approximately 2 rpm.

It is, of course, to be understood that the present invention is, by no means, limited to the specific showing in the drawing but also comprises any modifications within the scope of the appended claims.

What I claim is:

1. A device for continuously separating easily destroyable particles in a protective manner, especially heavy metal particles for core reactors, from a first liquid and introducing the separated particles into a second liquid without having first and second liquids coming into contact with each other, which includes in combination: a housing having an upper portion and a lower portion, an endless screen rotatably arranged in said housing, and defining a hollow chamber therein, a feeding conduit extending into the upper portion of said housing and having its mouth above said screen for feeding and discharging a first liquid with the particles to be separated therefrom onto the screen portion therebelow, liquid catching container means arranged within said hollow chamber below the mouth of said feeding conduit for collecting the liquid discharged from said mouth and passing through said screen, said container means having an outlet extending through said housing to discharge the liquid collected by said liquid catching container means, said lower portion of said housing forming a chamber means for holding a second liquid to receive the particles screened out from the first liquid discharged by said feeding conduit onto and screened out by said screen and remaining only on the outer surface of said screen, and means for setting liquid level of the second liquid.

2. A device in combination according to claim 1, in which said lower portion of said housing has an inlet for the second liquid and an outlet, said means for setting the liquid level including has an adjustable valve in said outlet for continuously controlling the level of the second liquid in said chamber means formed by said lower portion of said housing.

3. A device in combination according to claim 2, in which said valve in the outlet of said chamber means in said lower housing are adjustable so that when filling said last mentioned means with the second liquid its level is approximately tangentially touching the adjacent screen particles.

4. A device in combination according to claim 1, in which said endless screen forms a rotatable drum journalled in said housing.

5. A device in combination according to claim 1, which includes suction means arranged inside said screen and angularly spaced in moving direction of said screen from the intended impact area of liquid discharged from said feeding line onto said screen.

6. A device in combination according to claim 1, which includes suction means arranged inside said screen and angularly spaced in moving direction of said screen from the intended contact area of the second liquid with said screen.

* * * * *